United States Patent
Zhang et al.

(10) Patent No.: US 8,432,922 B2
(45) Date of Patent: Apr. 30, 2013

(54) METHOD FOR MANAGING IP TUNNELS (75) Inventors: Jing-Feng Zhang, Tienjin (CN); Kun Xie, Tienjin (CN); Qing-Yong Shen, Tienjin (CN); Yih Yung, Taipei (CN)

(73) Assignee: Xtera Communications, Inc., Allen, TX (US)

( * ) Notice: Subject to any disclaimer, the term of this patent is extended or adjusted under 35 U.S.C. 154(b) by 478 days.

(21) Appl. No.: 12/132,096

(22) Filed: Jun. 3, 2008

(65) Prior Publication Data
US 2009/0296721 A1 Dec. 3, 2009

(51) Int. Cl.
*H04W 4/00* (2009.01)

(52) U.S. Cl.
USPC ............ 370/401; 370/331; 370/338; 370/389

(58) Field of Classification Search .................. 370/401, 370/338, 389
See application file for complete search history.

(56) References Cited

U.S. PATENT DOCUMENTS

| | | | |
|---|---|---|---|
| 7,020,464 B2* | 3/2006 | Bahl et al. .................. | 455/432.1 |
| 2004/0081118 A1* | 4/2004 | Mukherjee et al. ........... | 370/328 |
| 2005/0223248 A1* | 10/2005 | Lim et al. ..................... | 713/300 |
| 2006/0198345 A1* | 9/2006 | Chen .............................. | 370/338 |
| 2008/0002686 A1* | 1/2008 | Valli et al. ..................... | 370/389 |
| 2008/0037478 A1* | 2/2008 | Na et al. ......................... | 370/338 |
| 2008/0117844 A1* | 5/2008 | Thubert et al. ................ | 370/310 |
| 2008/0186897 A1* | 8/2008 | Rune et al. ..................... | 370/315 |
| 2008/0270794 A1* | 10/2008 | Falk et al. ..................... | 713/168 |
| 2009/0300217 A1* | 12/2009 | Patel et al. .................... | 709/245 |

\* cited by examiner

*Primary Examiner* — Dang Ton
*Assistant Examiner* — Pamit Kaur
(74) *Attorney, Agent, or Firm* — James Harlan (57) ABSTRACT

A method for managing Internet Protocol (IP) tunnels is provided. The method is executed by a local host. There is at least one IP tunnel planned between the local host and a remote host. The method comprises the following steps. If the local addresses of the tunnels include dynamic IP addresses, acquire the dynamic IP addresses. All tunnels with known remote addresses are built. If there are known remote addresses and the local addresses include dynamic IP addresses, send a notification to the remote host, wherein the notification includes all local dynamic IP addresses. If any local address changes, all tunnels with changed local addresses and known remote addresses are rebuilt. A message is received from the remote host and classified. If the message is a notification, the tunnels are updated according to the remote addresses included in the message, and an acknowledgement is sent back to the remote host.

18 Claims, 7 Drawing Sheets

METHOD FOR MANAGING IP TUNNELS

FIELD

The present invention relates to Internet protocol (IP) tunnels. More particularly, the present invention relates to a method for managing IP tunnels.

BACKGROUND

Internet protocol (IP) tunnels are widely used in computer networks. Taking a typical network structure shown in FIG. 1 as an example, the network shown in FIG. 1 includes six hosts, wherein the hosts W, X, Y, and Z are all personal computers, and the hosts A and B are servers for providing functions such as bandwidth management etc. The hosts A, W and X are located within a same local area network 101. The host A is a gateway of the local area network 101 for external connection, and is connected to the Internet 103 via two leased lines L1 and L2. The leased lines L1 and L2 are provided by different Internet service providers. The host A applies different Internet protocol addresses (IP addresses) IP1 and IP2 in different leased lines L1 and L2. For convenience, the IP address is referred to as address below.

Figure 1:
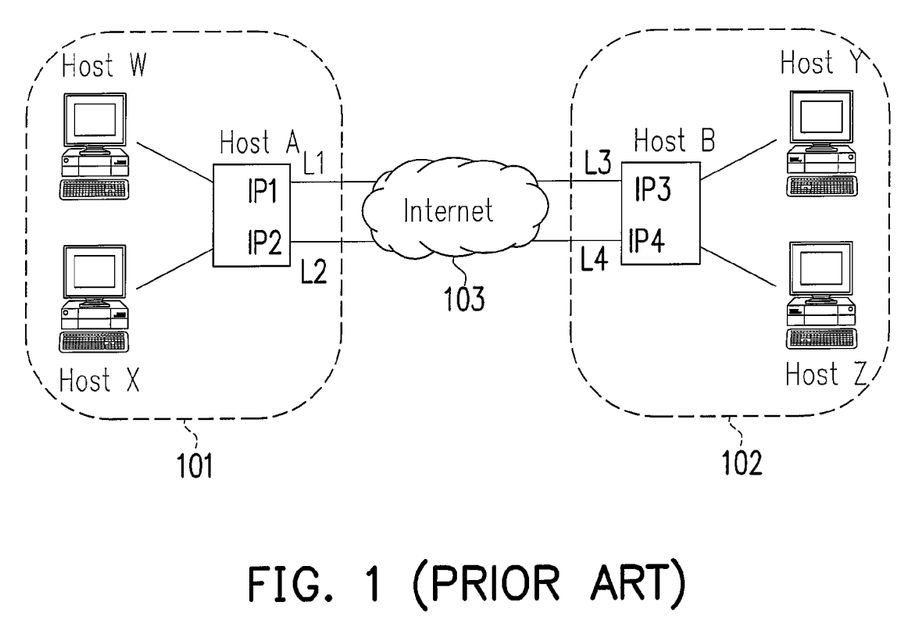
FIG. 1 is a structural diagram of a typical network applying Internet protocol tunnels.

On the other hand, the hosts B, Y and Z are located within another local area network 102. The host B is a gateway of the local area network 102 for external connection, and is connected to the Internet 103 via two leased lines L3 and L4. The leased lines L3 and L4 are provided by different Internet service providers. The host B applies different addresses IP3 and IP4 in different leased lines L3 and L4.

The local area networks 101 and 102 respectively belong to two branches of a same enterprise. To properly utilize the bandwidth of the networks, a plurality of IP tunnels may be planned between the host A and the host B, and packets transmitted between the local area networks 101 and 102 may use these tunnels in turn. To be brief, the IP tunnel is referred to as tunnel below.

For example, two tunnels may be electronically built between the host A and the host B, one of the two tunnels is from the address IP1 of the host A to the address IP3 of the host B, another one is from the IP2 of the host A to the IP4 of the host B, and a packet transmitted between the two local area networks has a 50% chance to use one of the two tunnels. Assuming a file is about to be transmitted from the host W to the host Y, a first packet thereof may use the tunnel IP1-IP3. A packet (packet 1) to be transmitted from the host W to the host Y is first transmitted from the host W to the host A, the host A then transmits the packet 1 to the host B via another packet (packet 2) transmitted from the IP1 to the IP3. Thereafter, the host B receives the packet 2 and fetches the packet 1 therein, and transmits the packet 1 to the host Y. Similarly, if the packet to be transmitted from the host W to the host Y uses the tunnel IP2-IP4, the packet (packet 3) to be transmitted from the host W to the host Y is first transmitted from the host W to the host A, the host A then transmits the packet 3 to the host B via another packet (packet 4) transmitted from the IP2 to the IP4. Thereafter, the host B receives the packet 4 and fetches the packet 3 therein, and transmits the packet 3 to the host Y.

Since tunnels are widely used, operating system kernels such a Linux system has a built-in tunnel support, by which the tunnels may be set up via simple instructions.

SUMMARY

A shortcoming of the above conventional method is that two ends of the tunnel have to be static IP addresses. If a dynamic IP address or dynamic IP addresses acquired via approaches such as dynamic host configuration protocol (DHCP) or point-to-point protocol over Ethernet (PPPoE) is/are applied to one of the two ends or both two ends of the tunnel, and if the dynamic IP address/dynamic IP addresses is/are changed, the tunnel on the other side then cannot be connected via the original addresses. In that case, the tunnel then cannot be maintained.

A method for managing an IP tunnel is disclosed, by which regardless of how many tunnels there are between two hosts, as long as there is at least one static address or at least one dynamic address maintained by an intermediate server (referred to as an intermediate address hereinafter), one or more tunnels between the two hosts may be maintained as connected or unobstructed during normal operation of the two hosts regardless of how other addresses changes, or whether or not the two hosts located at two sides of the tunnel reboot.

According to an aspect of the present invention, there is provided a method for managing an IP tunnel, which is executed by a local host. There is a tunnel planned between the local host and a remote host. The method includes electronically building a tunnel with a dynamic address and a known remote address, sending a notification to the remote host, the notification including the dynamic address, and if the dynamic address is changed, rebuilding the tunnel with the changed dynamic address and the known remote address.

In an embodiment, the method further includes repeating at time intervals the sending of the notification to the remote host.

In an embodiment, the method further includes attaching a dynamic address inquiry to the notification to inquire if the remote address includes a dynamic address.

In an embodiment, the method further includes, if the dynamic address is changed and a remote address is known, sending another notification to the remote host, the other notification including the changed dynamic address.

In an embodiment, the method further includes if the dynamic address of the tunnel includes an intermediate address, connecting to an intermediate server corresponding to the intermediate address to update the intermediate address; if the remote address of the tunnel includes an intermediate address, inquiring the intermediate server for the intermediate address included within the remote address; and if the intermediate address included within the dynamic address is changed, connecting to the intermediate server to update to the changed intermediate address.

In an embodiment, the method further includes receiving a message from the remote host and if the message is a notification, updating the tunnel according to a remote address received from the remote host in the message and sending an acknowledgement corresponding to the message to the remote host.

In an embodiment, the method further includes attaching a local dynamic address to the acknowledgement if the message received comprises a dynamic address inquiry.

In an embodiment, the method further includes, if the message is an acknowledgement and comprises a remote address, updating the tunnel according to the remote address included in the message.

According to an aspect of the present invention, there is provided a method for managing an IP tunnel, the method including electronically building a tunnel with a dynamic address associated with a local host and a remote address associated with a remote host; and maintaining connection of the tunnel when an address of the tunnel is changed by receiving or sending the changed address using a static address of the remote host or local host and/or an intermediate address maintained by an intermediate server.

According to an aspect of the present invention, there is provided a computer program, embodied in a storage medium, including one or more sequences of machine-readable instructions to cause execution of a method for managing an Internet protocol (IP) tunnel, for being executed by a local host, wherein an IP tunnel is planned between the local host and a remote host, the method for managing an IP tunnel including building a tunnel with a dynamic address and a known remote address; sending a notification to the remote host, the notification including the dynamic address; and if the dynamic address is changed, rebuilding the tunnel with the changed dynamic address and the known remote address.

According to an exemplary embodiment of the present invention, in the method for managing an IP tunnel, the hosts located at two ends of the tunnels may timely notify each other of their present dynamic address(es), and may notify each other immediately when any address is changed, and therefore the two hosts may always have the correct addresses, so as to maintain the tunnels as connected. Moreover, if there is at least one static address, or at least one dynamic address maintained by an intermediate server, regardless of how the other addresses change or whether or not the two hosts located at two sides of the tunnels reboot, there is at least one reliable address that exist for connection. Therefore, a tunnel between the two hosts may be maintained as connected as long as the two hosts operate normally.

BRIEF DESCRIPTION OF THE DRAWINGS

Embodiments of the invention will now be described, by way of example only, with reference to the accompanying schematic drawings in which corresponding reference symbols indicate corresponding parts.

DETAILED DESCRIPTION

In an embodiment of the present invention, a so-called host may be a personal computer, a server or any other computing device, i.e. any device that may be connected to a network and capable of executing a method of an embodiment of the present invention. A difference between planning a tunnel and building a tunnel is that planning a tunnel represents a tunnel plan between two hosts, for example a tunnel configuration stored in files, by which existence of a real tunnel is not required; and building a tunnel represents steps of building a real tunnel. To build a tunnel, addresses of two ends of the tunnel have to be acquired. The addresses are grouped into static addresses and dynamic addresses, wherein the static addresses maintain unchanged after being determined, and the dynamic addresses may be changed at any time.

Figure 2:
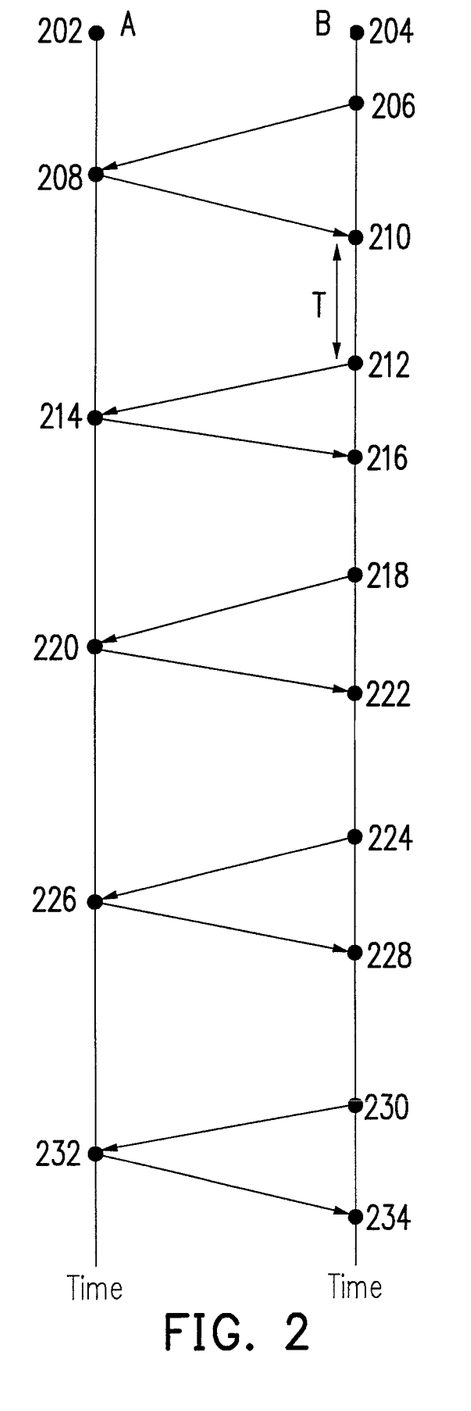
FIGS. 2 to 5 are flowcharts illustrating methods for managing IP tunnels according to embodiments of the present invention.

FIG. 2 is a flowchart illustrating an embodiment of the present invention. In this embodiment, there is only one tunnel between hosts A and B, wherein the host A applies a static address and the host B applies a dynamic address, as shown in Table 1.

TABLE 1

| Host A | Host B |
|---|---|
| Static address | Dynamic address |

First, operating systems of the hosts A and B are respectively activated at 202 and 204 of FIG. 2. At 206, the host B acquires the dynamic address via DHCP or PPPoE. The host B also has the static address of the host A, and so the host B has both addresses of the two tunnel ends, and therefore the tunnel may be built. The dynamic address of the host B is sent to the host A. At 208, the host A receives the dynamic address of the host B, and now the host A also has both addresses of the two tunnel ends, and therefore the tunnel may be built. After receipt by host A of the dynamic address of host B, an acknowledgement is sent to the host B. Next, at 210, the host B receives the acknowledgement of the host A, and the tunnel is connected.

After a certain time interval T, at 212, the host B again sends its dynamic address to the host A. Next, at 214, the host A receives information from the host B. If the dynamic address of the host B has not changed, the host A directly responds with an acknowledgement to the host B. At 216, the host B receives the acknowledgement of the host A.

The same process is repeated after time interval T at 218~222 to determine whether the dynamic address of the host B has changed.

At 224, the dynamic address of the host B is changed. Since the host B has the static address of the host A, the host B may rebuild the tunnel with a new dynamic address, and send a notification of the new dynamic address to the host A. At 226, the host A receives the new dynamic address of the host B, and then the tunnel is rebuilt according to the new dynamic address of the host B, and an acknowledgement is sent to the host B. At 228, the host B receives the acknowledgement of the host A after receipt by the host A of the new dynamic address, and the tunnel is again connected.

After the time interval T, at 230, the host B again sends its dynamic address to the host A. At 232, the host A receives information from the host B, and since the dynamic address of the host B has not changed, the host A directly responds with an acknowledgement to the host B. At 234, the host B receives the acknowledgement of the host A.

In this embodiment, the host A is a passive recipient, and the host B is an active sender. The host B periodically sends its dynamic address to the host A, and awaits an acknowledgement from the host A. If the acknowledgement is not received from the host A within a certain time interval, the host B resends its dynamic address to the host A. By such means, regardless of a network interruption or a host reboot, the tunnel between the host A and the host B may be swiftly rebuilt.

In a further embodiment, there are two tunnels between the host A and the host B, tunnel planning of the host A is shown in Table 2A, and tunnel planning of the host B is shown in Table 2B below.

TABLE 2A

| tunnel planning of the host | | |
|---|---|---|
| Tunnel | Local address | Remote address |
| #1 | Static address | Static address |
| #2 | TKT#2 | AVT#2 |

TABLE 2B

| tunnel planning of the host B | | |
| --- | --- | --- |
| Tunnel | Local address | Remote address |
| #1 | Static address | Static address |
| #2 | AVT#2 | TKT#2 |

In Table 2A, the local address is the tunnel address of the host A, and the remote address is the tunnel address of the host B located at the other side of the tunnel. In Table 2B, the definitions of the local address and the remote address are reversed, in which the local address is the tunnel address of the host B, and the remote address is the tunnel address of the host A.

There are more than one dynamic addresses in this embodiment, and therefore a combination of host IDs and serial numbers of leased lines are applied for division. Each host has a unique host ID, in which the host ID of the host A is TKT, and the host ID of the host B is AVT. Moreover, each leased line has a serial number, and so the dynamic address of the host A for the leased line #2 is TKT#2, and the dynamic address of the host B for the leased line #2 is AVT#2.

Figure 3:
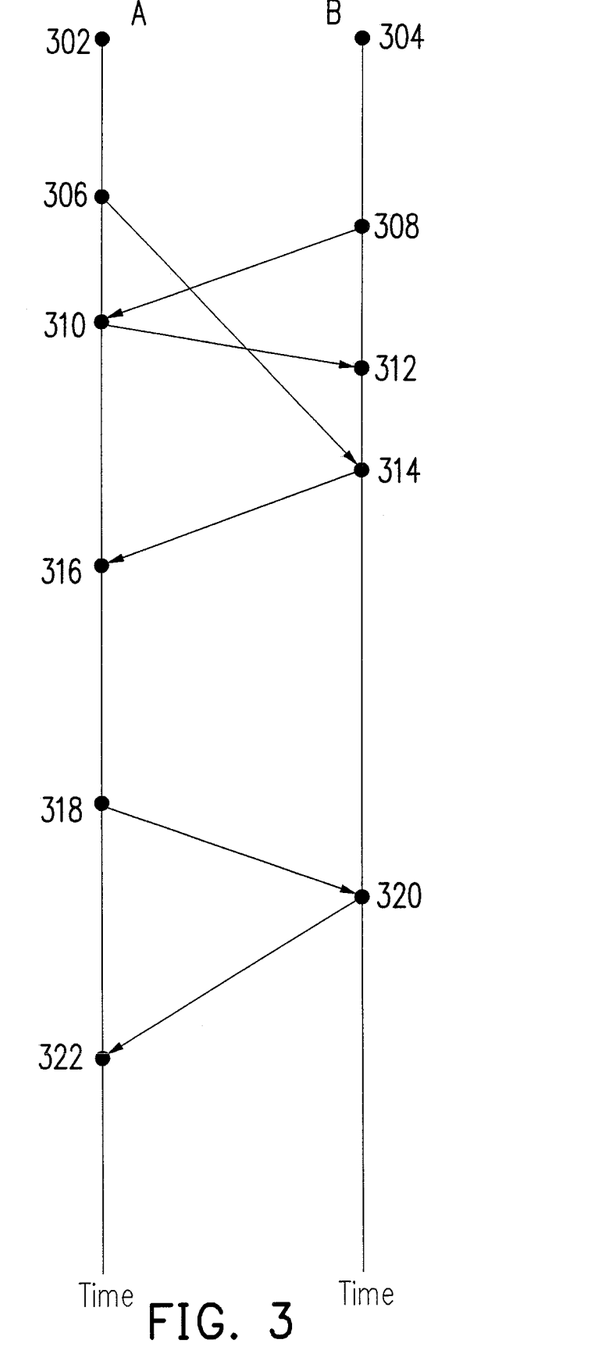

FIG. 3 is a flowchart of this embodiment. First, operating systems of the hosts A and B are respectively activated at 302 and 304. At 306, the host A acquires the dynamic address TKT#2, and since the static addresses of two ends of a tunnel #1 are known, the host A then builds the tunnel #1. The host A sends the dynamic address TKT#2 to the host B and inquires for the dynamic address of the host B. At 308, the host B acquires the dynamic address AVT#2, and since the static addresses of two ends of the tunnel #1 are known, the host B then builds the tunnel #1. The host B sends the dynamic address AVT#2 to the host A and inquires for the dynamic address of the host A. Next, at 310, the host A receives the dynamic address AVT#2 of the host B, and builds a tunnel #2. The host A sends its dynamic address TKT#2 and after receipt of the dynamic address from host B, an acknowledgement to the host B. At 312, the host B receives the acknowledgement and the dynamic address TKT#2 of the host A, and builds the tunnel #2. Now, the tunnel #2 is connected. Next, at 314, the host B receives the dynamic address TKT#2 of the host A, and since the host B has built the tunnel #2, and the dynamic address of the host A remains unchanged at 314, rebuilding of the tunnel #2 by the host B is then unnecessary. The host B sends its dynamic address AVT#2 and after receipt of the dynamic address from host A, an acknowledgement to the host A. At 316, the host A receives the acknowledgement from host B and the dynamic address AVT#2 of the host B, and since the host A has built the tunnel #2, and the dynamic address of the host B remains unchanged at 316, rebuilding of the tunnel by the host A is then unnecessary.

At step 318, the dynamic address TKT#2 of the host A is changed, and therefore the host A rebuilds the tunnel #2 according to the new dynamic address. Then, the host A selects one of the two known addresses of the host B (i.e., the static address or the last dynamic address AVT#2 of host B), for example, selects one of the addresses by a round robin method, so as to send the new dynamic address TKT#2 of the host A to the host B. At 320, the host B receives the new dynamic address of the host A, and since the dynamic address TKT#2 is changed, the host B then rebuilds the tunnel #2 and sends an acknowledgement to the host A. At 322, the host A receives the acknowledgement of the host B after receipt of the new dynamic address from host B.

In a further embodiment, there are also two tunnels between the host A and the host B, wherein only one of the addresses is a static address, and the other three addresses are all dynamic addresses. Tunnel planning of the hosts A and B is shown as Tables 3A and 3B respectively.

TABLE 3A

| tunnel planning of the host A | | |
| --- | --- | --- |
| Tunnel | Local address | Remote address |
| #1 | Static address | AVT#1 |
| #2 | TKT#2 | AVT#2 |

TABLE 3B

| tunnel planning of the host B | | |
| --- | --- | --- |
| Tunnel | Local address | Remote address |
| #2 | AVT#2 | TKT#2 |
| #1 | AVT#1 | Static address |

In Table 3A, the local address is the tunnel address of the host A, and the remote address is the tunnel address of the host B located at the other side of the tunnel. In Table 3B, the definitions of the local address and the remote address are reversed, in which the local address is the tunnel address of the host B, and the remote address is the tunnel address of the host A.

Figure 4:
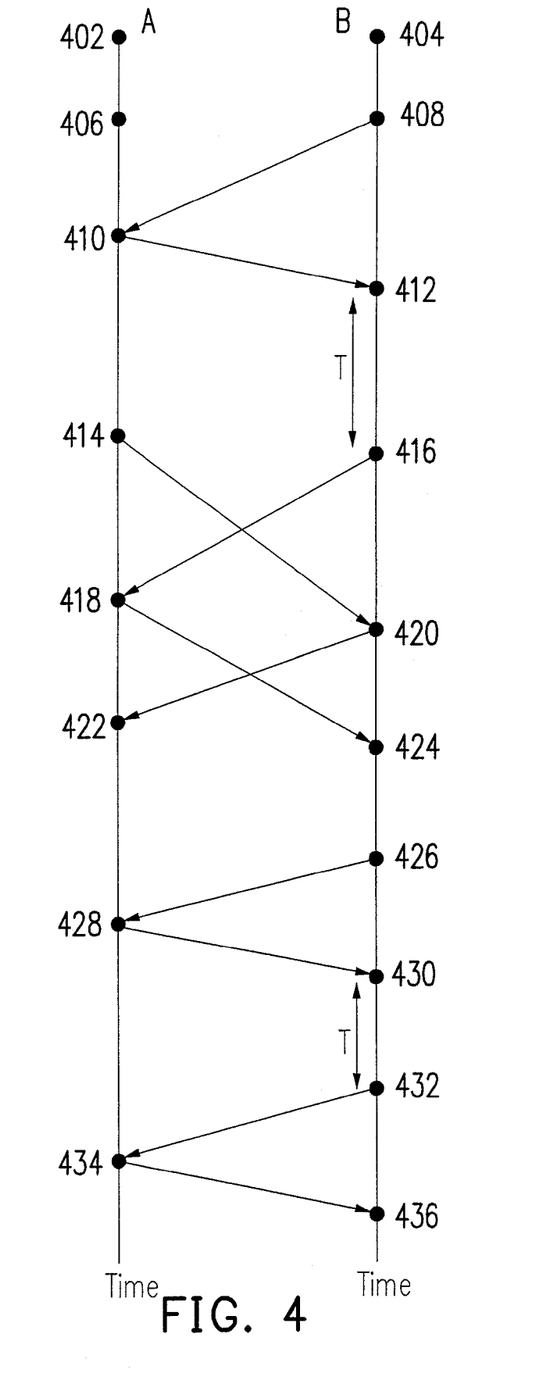

Referring to the FIG. 4 flowchart for this embodiment, the operating systems of the hosts A and B are respectively activated at 402 and 404. At 406, the host A acquires the dynamic address TKT#2. The host A does have the dynamic address of the host B yet, and therefore the address TKT#2 cannot be sent to the host B. The host A waits for a notification from the host B of an address of host B. At step 408, the host B acquires the dynamic addresses AVT#1 and AVT#2, and builds the tunnel #1 since it has the static address of host A. However, since the host B does not have the dynamic address TKT#2 of host A yet, the tunnel #2 cannot be built. Thereafter, the host B sends the dynamic addresses AVT#1 and AVT#2 to the host A, and inquires for the dynamic address TKT#2 of host A. At 410, the host A receives the dynamic address notification of the host B and builds the tunnels #1 and #2, and responds with an acknowledgement and sends the dynamic address TKT#2 to the host B. Now, the tunnel #1 is connected. At 412, the host B receives the acknowledgement and the dynamic address TKT#2 of the host A and builds the tunnel #2. Now, the tunnel #2 is connected.

At 414, the dynamic address TKT#2 of host A is changed, and therefore the host A rebuilds the tunnel #2 according to the new dynamic address. The host A selects one of the two known addresses of the host B (i.e., AVT#1 or AVT#2 of host B), for example, selects one of the addresses by a round robin method, so as to send the new dynamic address TKT#2 of the host A to the host B.

At 416, periodic notification is performed at intervals of time interval T, by which the host B sends its dynamic addresses to the host A and inquires for the dynamic addresses of the host A. At 418, the host A receives the dynamic address notification from the host B, and since the addresses of the host B have not changed, rebuilding of a tunnel is unnecessary. The host A sends an acknowledgement of the notification and sends the dynamic address TKT#2 to the host B. At 420, the host B receives the new dynamic address TKT#2 and builds the tunnel #2, and responds with an acknowledgement to the host A. At 422, the host A receives that acknowledgement of the host B. At 424, the host B receives the acknowledgement from host A of receipt of the notification and the dynamic address TKT#2 of the host A, and since the dynamic address TKT#2 remains unchanged since at 420, rebuilding of the tunnel by the host B is unnecessary.

At 426, the dynamic address AVT#1 of the host B is changed, and therefore the host B rebuilds the tunnel #1 and sends the changed address AVT#1 to the host A. At 428, the host A receives the changed address AVT#1 and rebuilds the tunnel #1, and sends an acknowledgement to the host B of receipt of the changed address AVT#1. At 430, the host B receives that acknowledgement of the host A.

At step 432, periodic notification is performed at intervals of time interval T, by which the host B sends its dynamic addresses to the host A and inquires for the dynamic addresses of the host A. At 434, the host A receives that dynamic address notification from the host B, and since the addresses of the host B has not changed, rebuilding of the tunnel is unnecessary, and an acknowledgement and the address TKT#2 are sent to the host B. At 436, the host B receives that acknowledgement and the address TKT#2 of the host A, and rebuilding of the tunnel is also unnecessary.

In a further embodiment, a dynamic address maintained by an intermediate server (such a dynamic address is referred to as an intermediate address hereinafter) is used to build the tunnel. A host using such an intermediate address may be connected to the intermediate server to update the intermediate address, when the operating system thereof is activated or when the intermediate address is changed. Therefore, the intermediate server always has the correct intermediate address, and other hosts may acquire the correct intermediate address by inquiring the intermediate server, so as to connect with the host using the intermediate address. The intermediate address may substitute for a static address of one or more of the hosts to provide a reliable address, so as to help maintain the tunnels connected.

In this embodiment, a dynamic domain name system (DDNS) is applied to provide the intermediate address, and therefore the aforementioned intermediate server is a DDNS server, and the intermediate address applies a dynamic domain name for recognition. Tunnel planning of the hosts A and B is shown in Tables 4A and 4B respectively, wherein foo.ddns.com is the intermediate address.

TABLE 4A tunnel planning of the host A

| Tunnel | Local address | Remote address |
|---|---|---|
| #1 | foo.ddns.com | AVT#1 |
| #2 | TKT#2 | AVT#2 |

TABLE 4B tunnel planning of the host B

| Tunnel | Local address | Remote address |
|---|---|---|
| #1 | AVT#1 | foo.ddns.com |
| #2 | AVT#2 | TKT#2 |

In Table 4A, the local address is the tunnel of host A and/or the intermediate address, and the remote address is the tunnel address of the host B located at the other side of the tunnel. In Table 4B, the definitions of the local address and the remote address are reversed, in which the local address is the tunnel address of the host B, and the remote address is the tunnel address of the host A and/or the intermediate address.

Figure 5:
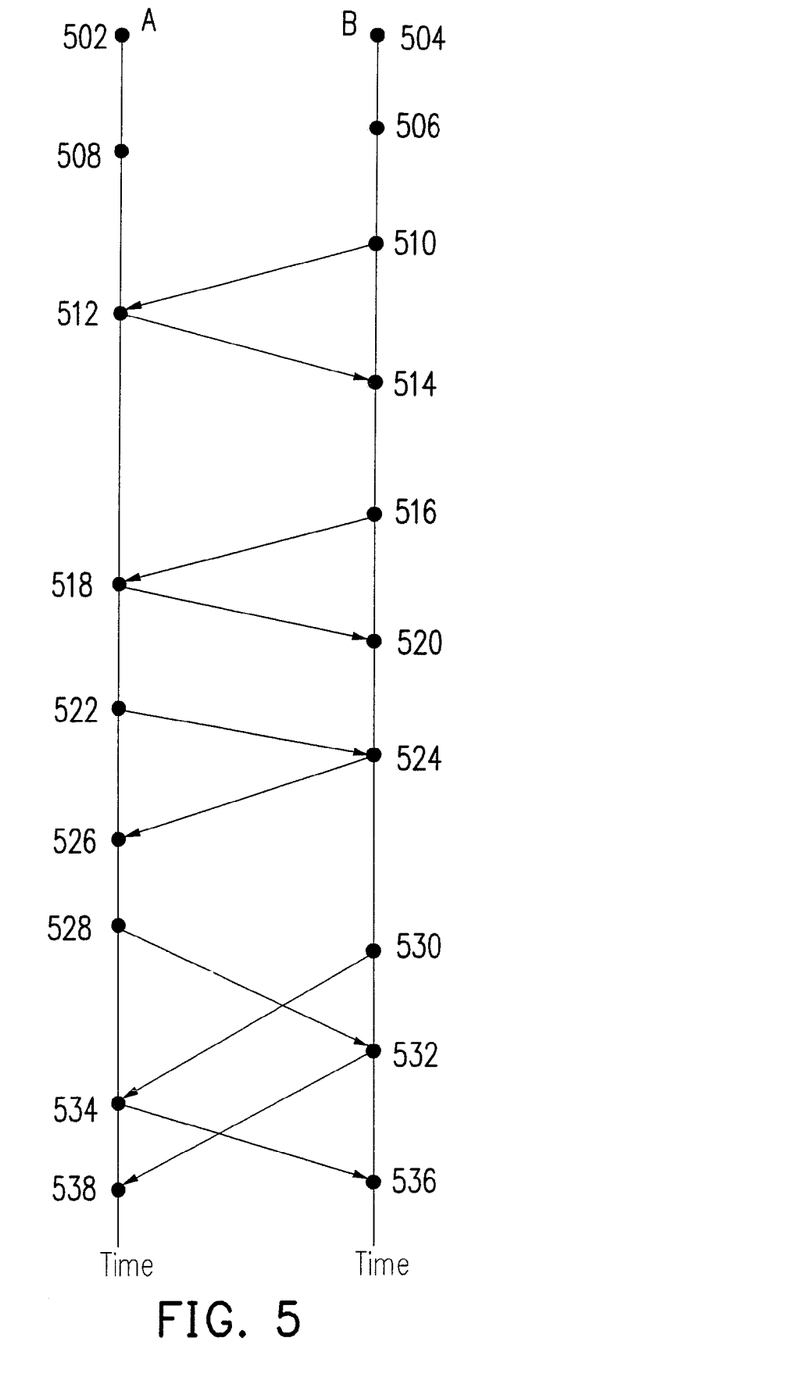

Referring to the FIG. 5 flowchart of this embodiment, the operating systems of the hosts A and B are respectively activated at 502 and 504. At 506, the host B acquires the dynamic addresses AVT#1 and AVT#2, and inquires the DDNS server for the foo.ddns.com. However, the inquiry fails. At 508, the host A acquires the dynamic address TKT#2, and connects to the DDNS server to update the foo.ddns.com. After a certain time interval T, at 510, the host B again inquires the DDNS server for the foo.ddns.com and successfully acquires the corresponding address of the foo.ddns.com. Thereafter, the host B builds the tunnel #1, connects to the address associated with the foo.ddns.com to send dynamic addresses AVT#1 and AVT #2 to host A, and inquires for the dynamic address TKT#2 of host A. At 512, the host A receives the dynamic addresses AVT#1 and AVT#2 of the host B and builds the tunnels #1 and #2, wherein the tunnel #1 is now connected. The host A responds with an acknowledgement of receipt of the dynamic addresses of host B and sends the dynamic address TKT#2 to the host B. At 514, the host B receives that acknowledgement and the dynamic address TKT#2 of the host A and builds the tunnel #2. Now, the tunnel #2 is connected.

At 516, a periodic notification is performed at intervals of time interval T, by which the host B sends its dynamic addresses to the host A and inquires for the dynamic address TKT#2 of host A. At 518, the host A receives the dynamic address notification from the host B, and since the addresses of the host B have not changed, rebuilding of a tunnel is unnecessary. An acknowledgement and the address TKT#2 are sent to the host B. At 520, the host B receives that acknowledgement and the address TKT#2 of the host A, and rebuilding of the tunnel is also unnecessary.

At 522, the address associated with foo.ddns.com is changed, and therefore the host A connects to the DDNS server to update the address of the foo.ddns.com. Host A rebuilds the tunnel #1, and sends the new address to the host B. At 524, the host B receives the new address of the foo.ddns.com and rebuilds the tunnel #1, and responds with an acknowledgement to the host A. At 526, the host A receives that acknowledgement of the host B.

At 528, the address of the foo.ddns.com is changed again, and therefore the host A connects to the DDNS server to update the address associated with the foo.ddns.com. Host A rebuilds the tunnel #1, and sends the new address to the host B. At 530, the dynamic address AVT#1 of the host B is changed, and therefore the host B rebuilds the tunnel #1 and connects with the foo.ddns.com to send the new address of host B. However, since the address of the foo.ddns.com is changed, connection of the host B with the foo.ddns.com fails, and therefore the host B turns to connect with the dynamic address TKT#2 to send the new address AVT#1 to the host A. At 532, the host B receives the new address of the foo.ddns.com and rebuilds the tunnel #1, and then responds with an acknowledgement to the host A. At 534, the host A receives the new address AVT#1 and rebuilds the tunnel #1, and responds with an acknowledgement to the host B. At 536, the host B receives that acknowledgement of the host A. At 538, the host A receives that acknowledgement of the host B.

Though the DDNS server is applied to this embodiment, the present invention is not limited thereto, and any other kind of intermediate server may be applied to provide the intermediate address.

Figure 6:
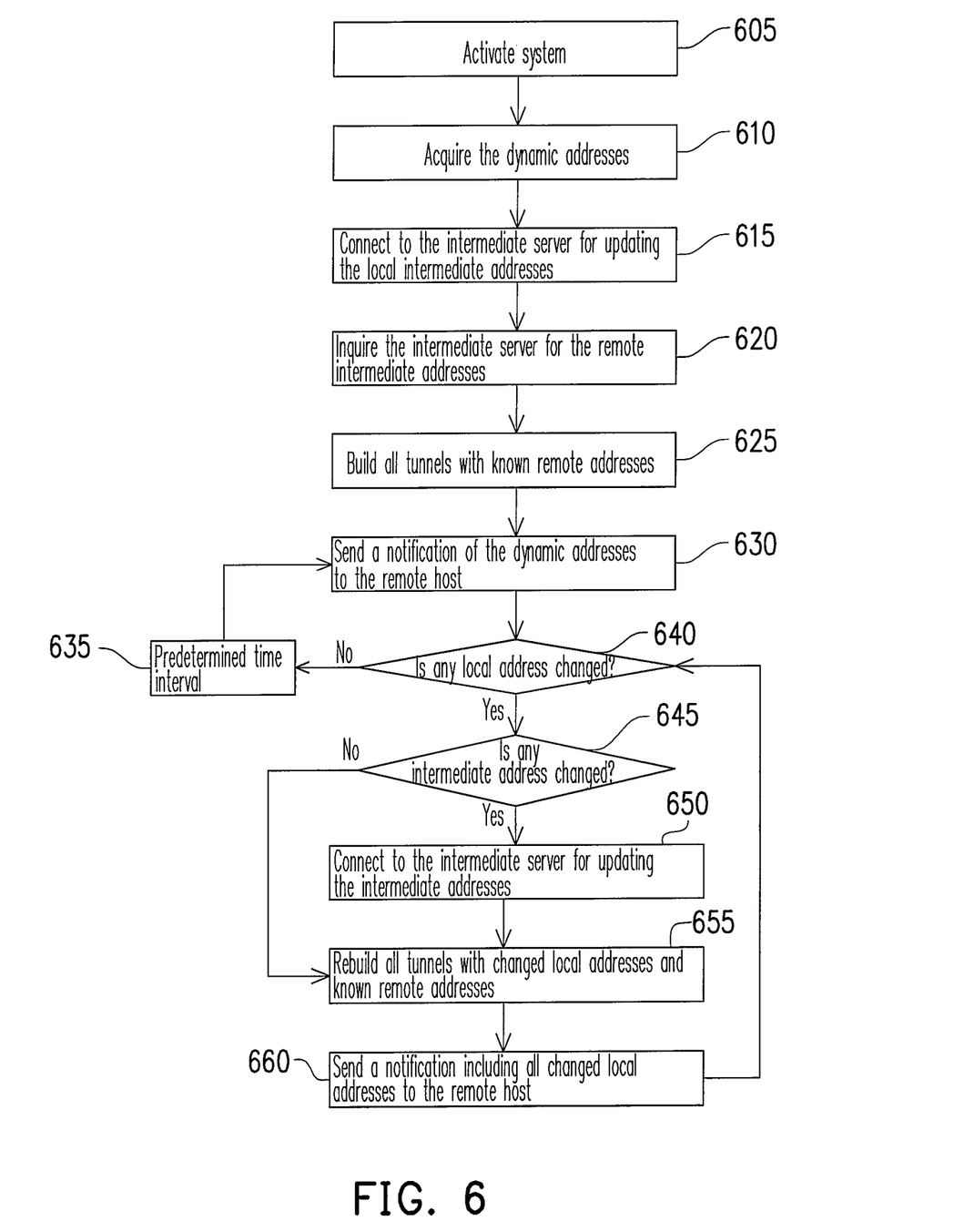
FIGS. 6 and 7 are overall flowcharts illustrating a method for managing IP tunnels according to an embodiment of the present invention.
Figure 7:
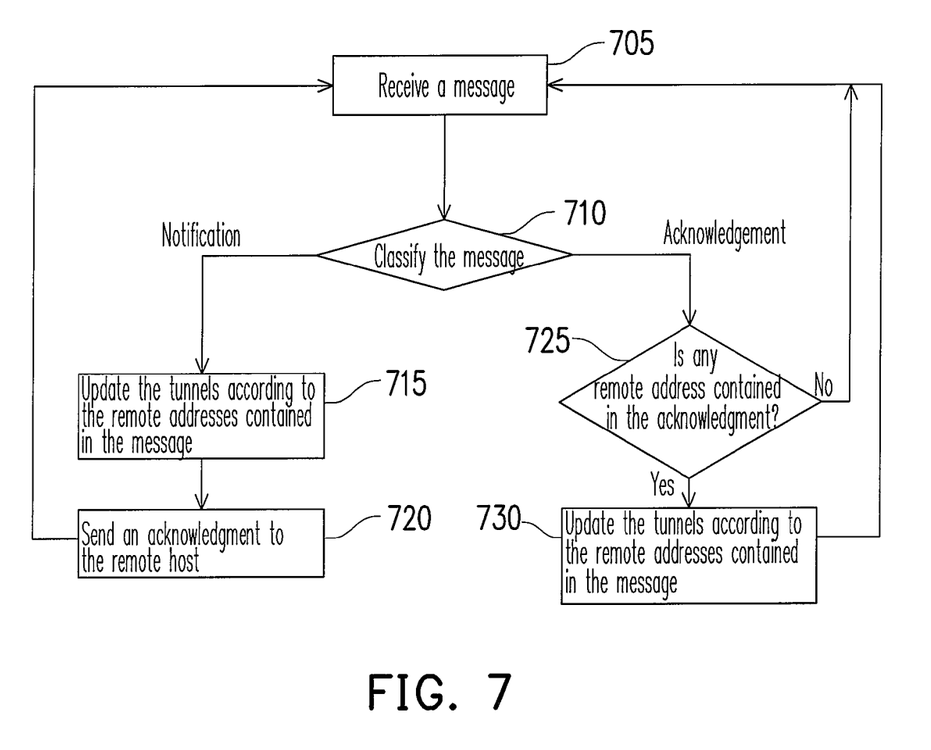

FIGS. 6 and 7 depict overall flowcharts illustrating a method for managing IP tunnels according to an embodiment of the present invention. FIG. 6 illustrates a flow for a message sending part and FIG. 7 illustrates a flow for a message receiving part. The same method (i.e. the method shown as flowcharts of FIG. 6 and FIG. 7) may be applied by the hosts located at two sides of the tunnel, wherein the local host and the remote host are relative. Taking the aforementioned hosts A and B as an example, in view of the host A, the host A is the local host, and the host B is the remote host. Conversely, in view of the host B, the host B is the local host, and the host A is the remote host. Similarly, the local address and the remote address of the tunnel apply the same relative definition.

The perspective of the local host is used in the flowcharts of FIG. 6 and FIG. 7, by which at least one tunnel is planned between the local host and the remote host, and at least one such tunnel applies a static address or a intermediate address. The description hereafter refers to a method of managing multiple tunnels but the method can be equally applied to managing a single tunnel.

Referring to FIG. 6, the operating system of the host is activated at 605. At 610, if the local addresses of the tunnels include dynamic addresses, the dynamic addresses are acquired. At 615, if the above local addresses include one or more intermediate addresses, a connection is made to an intermediate server corresponding to the intermediate address(es) to update the intermediate address(es).

At 620, according to the tunnel plan, if the remote addresses of the tunnels include one or more intermediate address(es), the local host inquires the intermediate server for the intermediate address(es) included within the remote addresses (i.e. the intermediate address(es) utilized by the remote host). If that inquiry of the intermediate address(es) fails, such inquiry is repeated at regular time intervals until the inquiry is successful.

At 625, the local addresses including one or more static addresses, one or more dynamic addresses and/or one or more intermediate addresses needed to build the tunnels are all ready, and therefore tunnels with known remote addresses can be built. At 630, if there are known remote addresses of the tunnels, i.e. known addresses that may be connected, and the local addresses include one or more dynamic addresses, a notification is then sent to the remote host, wherein the notification includes the local dynamic address(es). Moreover, if the remote addresses of the tunnels include one or more dynamic addresses, namely, if the remote host has one or more dynamic addresses, a dynamic address inquiry is sent to inquire for the remote dynamic address(es).

At 630, if there are more than one known remote addresses that may be connected, one of the known remote addresses is selected, for example, in a round robin approach, so as to connect to the remote host and send the notification. If the connection fails, another one of the known remote addresses is selected for connection, and if the connection fails again, the above selection is then repeated, until connection of the remote host is successful. Therefore, by utilizing the plurality of known remote addresses in turn, a fault-tolerant effect is achieved, and effective transmission of the dynamic address(es) should be achieved. If connection to the known remote addresses are all failed, and if the remote addresses include an intermediate address, namely, if the remote host applies an intermediate address, the local host may inquire the intermediate server for the updated intermediate address, so as to connect to the remote host.

At 640, whether (or not) any local address is changed is checked. If the local address(es) is not changed, after a time interval at 635, the notification sent to the remote host of a local dynamic address(es) at 630 is repeated.

Conversely, if one or more local addresses are changed, at 645, a determination is made whether (or not) one or more intermediate addresses changed, and if one or more intermediate addresses has changed, at 650, a connection is made to the intermediate server to update the intermediate address(es). If the changed address(es) is a normal dynamic address and not an intermediate address, a connection need not be made to the intermediate server.

At 655, one or more tunnels with a changed local address and known remote address is rebuilt. At 660, if there is a known remote address, namely, if there is a known remote addresses for the local host to connect to, a notification is sent to the remote host, wherein the notification includes the changed local dynamic address(es). If there are more than one known remote addresses, the known remote address may be selected by using a similar approach as at 630. If the remote host has an intermediate address, the intermediate address may be inquired like at 630, so as to connect to the remote host. After the notification is sent to the remote host at 660, the inquiry at 640 is repeated along with the subsequent steps thereafter.

A message receiving flow shown in FIG. 7 is now described. At 705, the local host receives a message from the remote host. At 710, the message is classified, and if the message is a notification, at 715, one or more of the aforementioned tunnels are updated according to the remote address(es) contained within the message, and at 720, a corresponding acknowledgement is sent to the remote host. Moreover, if the notification includes a dynamic address inquiry, one or more local dynamic addresses are sent (e.g., attached to the acknowledgement) by the local host at 720, so as to notify the remote host. After acknowledgement is sent at 720, receipt of a message at 705 and subsequent steps thereafter are repeated to continuously receive messages.

Sending the local dynamic address(es) in response to the acknowledgement is to notify the remote host as early as possible of the address(es). Periodic notification at 630 may also notify the remote host of the local dynamic address(es). Therefore, if timing is not essential, sending the local dynamic address(es) in response to the acknowledgement is then unnecessary.

If the message received at 705 is an acknowledgement, a determination is made at 725 of whether (or not) one or more remote address(es) are included with the acknowledgement. If there is, one or more tunnels are updated according to the included remote address(es) at 730. Thereafter, receipt of a message at 705 and subsequent steps thereafter are repeated to continuously receive messages.

Updating of a tunnel at 715 and 730 is described as follows. In the aforementioned tunnels, if there is a tunnel with an unknown remote address recorded in the local host, and there is a corresponding remote address in the received message, the tunnel is rebuilt according to the corresponding remote address of the message. Moreover, in the aforementioned tunnels, if there is a tunnel with a known remote address recorded in the local host, and there is a corresponding remote address in the received message, and the two remote addresses are different, it represents that the remote address is changed, and the tunnel is rebuilt according to the corresponding remote address of the message.

In summary, in a method for managing an IP tunnel, the hosts located at two sides of a tunnel may timely notify each other of their one or more present dynamic addresses, and may immediately notify each other each time when an address is changed, and therefore the two hosts have the correct address(es) to maintain a tunnel as connected. Moreover, since the tunnel(s) has at least one static address, or at least one intermediate address maintained by an intermediate server, regardless of how other addresses are changed, or whether or not the two hosts reboot, at least one reliable address may be provided for connection. Therefore, as long as the two host operate normally, one or more tunnels between the two hosts may be maintained as connected.

While specific embodiments of the invention have been described above, it will be appreciated that the invention may be practiced otherwise than as described.

The detailed descriptions may have been presented in terms of program procedures executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or specialized hardware used to implement an embodiment of the present invention is not limiting of the present invention. Thus, the operation and behavior of the embodiments often will be described without specific reference to the actual software code or specialized hardware components. The absence of such specific references is feasible because it is clearly understood that artisans of ordinary skill would be able to design software and hardware to implement the embodiments of the present invention based on the description herein with only a reasonable effort and without undue experimentation.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations of an embodiment of the present invention described herein; the operations are machine operations. Useful machines for performing the operations of an embodiment of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose. For example, an embodiment of the invention may be implemented as a firmware program loaded into non-volatile storage or a software program loaded from or into a data storage medium as machine-readable code, such code being instructions executable by an array of logic elements such as a microprocessor or other digital signal processing unit.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

An embodiment of the invention may be implemented as an article of manufacture comprising a computer usable medium having computer readable program code means therein for executing a method as disclosed herein, a program storage device readable by a machine, tangibly embodying a program of instructions executable by a machine to perform a method as disclosed herein, a computer program product, an article of manufacture comprising a computer usable medium having computer readable program code means therein, the computer readable program code means in said computer program product comprising computer readable code means for causing a computer to execute a method as disclosed herein, a computer readable medium encoded with a set of executable instructions to perform a method as disclosed herein, a computer program including one or more sequences of machine-readable instructions to cause execution of a method as disclosed herein, or a data storage medium having such a computer program stored therein. Such an article of manufacture, program storage device, computer program product or computer readable medium may include, but is not limited to, CD-ROMs, diskettes, tapes, hard drives, computer system memory (e.g. RAM or ROM) and/or the electronic, magnetic, optical, biological or other similar embodiment of the program (including, but not limited to, a carrier wave modulated, or otherwise manipulated, to convey instructions that can be read, demodulated/decoded and executed by a computer). Indeed, the article of manufacture, program storage device or computer program product may include any solid or fluid transmission medium, magnetic or optical, or the like, for storing or transmitting signals readable by a machine for controlling the operation of a general or special purpose computer according to a method as disclosed herein and/or to structure its components in accordance with a system as disclosed herein.

An embodiment of the invention may be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone).

The system may be specially constructed for the required purposes to perform, for example, a method as disclosed herein or it may comprise one or more general purpose computers as selectively activated or reconfigured by a computer program in accordance with the teachings herein stored in the computer(s). The system could also be implemented in whole or in part as a hard-wired circuit or as a circuit configuration fabricated into an application-specific integrated circuit. The invention presented herein is not inherently related to a particular computer system or other apparatus. The required structure for a variety of these systems will appear from the description given.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing multiple Internet protocol (IP) tunnels between a local host and a remote host, the method comprising:
   receiving, by the local host, a first and a second dynamic address for establishing tunnels with the remote host, wherein a first remote address of the remote host is known to the local host;
   electronically building a first tunnel between the local host and the remote host using the first dynamic address and the first known remote address;
   sending a notification to the remote host at the first known remote address, the notification including the first and the second dynamic addresses, the notification also including a request for a second remote address of the remote host;
   upon receiving the second remote address, and while the first tunnel is maintained, electronically building a second tunnel between the local host and the remote host using the second dynamic address and the second remote address; and
   upon the first or second dynamic address changing, rebuilding the corresponding tunnel with the changed dynamic address and the corresponding remote address.

2. The method of claim 1, comprising repeating at time intervals the sending of the notification to the remote host.

3. The method of claim 1, further comprising, upon the first or second dynamic address changing, sending another notification to the remote host, the other notification including the changed dynamic address.

4. The method of claim 3, wherein the sending of the notification, or the sending of the other notification, or both sending of the notification and the other notification, comprises:
   selecting one of a plurality of known remote addresses, the plurality comprising the first and second remote addresses, to connect to the remote host and sending the respective notification.

5. The method of claim 4, wherein one of the plurality of known remote addresses is selected using a round robin method.

6. The method of claim 4, wherein selecting one of the plurality of known remote addresses further comprises:
   upon connection to the remote host failing, selecting another known address from the plurality of known remote addresses to connect to the remote host, and repeating the selection if the connection to the remote host fails again, until the connection to the remote host is successful.

7. The method of claim 6, wherein selecting one of the plurality of known remote addresses further comprises:
   upon connections to the remote host based on the known remote addresses all failing, requesting an address for connecting to the remote host from an intermediate server that stores at least one address for connecting to the remote host.

8. The method of claim 1, wherein the first known remote address is a static address or is obtained using a static intermediate address to obtain the first known remote address from an intermediate server.

9. The method of claim 1, further comprising receiving a notification, from the remote host, that the second remote address has changed and updating the second tunnel to use the changed second remote address.

10. The method of claim 9, further comprising:
    sending an acknowledgment that the changed second remote address was received by the local host.

11. The method of claim 1, further comprising:
    receiving an inquiry from the remote host that requests the first dynamic address; and
    in response, sending the first dynamic address to the remote host.

12. The method of claim 11, further comprising:
    receiving an acknowledgment from the remote host that the first dynamic address was received.

13. A method for managing multiple Internet protocol (IP) tunnels between a local host and a remote host, the method comprising:
    receiving, by the local host, a first and a second dynamic address for establishing tunnels with the remote host, wherein a first remote address of the remote host is known to the local host;
    electronically building a first tunnel between the local host and the remote host using the first dynamic address and the first known remote address;
    sending a notification to the remote host at the first known remote address, the notification including the first and the second dynamic addresses, the notification also including a request for a second remote address of the remote host;
    upon receiving the second remote address, electronically building a second tunnel between the local host and the remote host using the second dynamic address and the second remote address;
    upon the first or second dynamic address changing, rebuilding the corresponding tunnel with the changed dynamic address and the corresponding remote address;
    the local host sending the first dynamic address to an intermediate server to be stored on the intermediate server in conjunction with an intermediate address that represents the first dynamic address; and
    upon the first dynamic address changing, the local host sending the changed first dynamic address to the intermediate server to be stored in conjunction with the intermediate address.

14. The method of claim 13, wherein the intermediate server is a dynamic domain name system (DDNS) server.

15. A method for managing multiple Internet protocol (IP) tunnels between a local host and a remote host, the method comprising:
    receiving, by the local host, a first and a second dynamic address for establishing tunnels with the remote host, wherein a first remote address of the remote host is known to the local host, wherein the local host obtains the first known remote address from an intermediate server by accessing the intermediate server using an intermediate address that represents the first known remote address;
    electronically building a first tunnel between the local host and the remote host using the first dynamic address and the first known remote address;
    sending a notification to the remote host at the first known remote address, the notification including the first and the second dynamic addresses, the notification also including a request for a second remote address of the remote host;
    upon receiving the second remote address, electronically building a second tunnel between the local host and the remote host using the second dynamic address and the second remote address; and
    upon the first or second dynamic address changing, rebuilding the corresponding tunnel with the changed dynamic address and the corresponding remote address.

16. The method of claim 15, wherein the intermediate server is a dynamic domain name system (DDNS) server.

17. The method of claim 15, wherein the intermediate server is a dynamic domain name system (DDNS) server.

18. A computer program, embodied in a non-transitory storage medium, comprising one or more sequences of machine-readable instructions which when executed by a processor perform the following:
- receiving, by the local host, a first and a second dynamic address for establishing tunnels with the remote host, wherein a first remote address of the remote host is known to the local host;
- electronically building a first tunnel between the local host and the remote host using the first dynamic address and the first known remote address;
- sending a notification to the remote host at the first known remote address, the notification including the first and the second dynamic addresses, the notification also including a request for a second remote address of the remote host;
- upon receiving the second remote address, and while the first tunnel is maintained, electronically building a second tunnel between the local host and the remote host using the second dynamic address and the second remote address; and
- upon the first or second dynamic address changing, rebuilding the corresponding tunnel with the changed dynamic address and the corresponding remote address.

* * * * *